United States Patent [19]

Deeba et al.

[11] Patent Number: 5,300,469
[45] Date of Patent: Apr. 5, 1994

[54] COMPOSITION FOR PASSIVATING VANADIUM IN CATALYTIC CRACKING AND PREPARATION THEREOF

[75] Inventors: Michel Deeba, North Brunswick; John M. Macaoay, Linden, both of N.J.; Paul R. Suitch, Milledgeville, Ga.; Roland von Ballmoos, Belle Mead, N.J.

[73] Assignee: Engelhard Corporation, Iselin, N.J.

[21] Appl. No.: 987,519

[22] Filed: Dec. 8, 1992

[51] Int. Cl.$^5$ .................... B01J 20/12; B01J 21/16
[52] U.S. Cl. ....................... 502/63; 502/84; 502/410; 502/521
[58] Field of Search ............ 502/63, 84, 251, 410, 502/521

[56] References Cited

U.S. PATENT DOCUMENTS

| | | | |
|---|---|---|---|
| 2,183,590 | 12/1939 | Rembert | 502/84 |
| 2,447,181 | 8/1948 | Butterbaugh et al. | 502/251 |
| 3,635,038 | 1/1972 | Nagel et al. | 62/17 |
| 3,699,037 | 10/1972 | Annesser et al. | 208/120 |
| 4,098,678 | 7/1978 | Schwarzenbek | 208/120 |
| 4,153,534 | 5/1979 | Vasalos | 208/120 |
| 4,153,535 | 5/1979 | Vasalos et al. | 208/120 |
| 4,206,039 | 6/1980 | Vasalos | 208/120 |
| 4,218,344 | 8/1980 | Vasalos | 252/455 Z |
| 4,221,677 | 9/1980 | Vasalos et al. | 252/455 Z |
| 4,238,317 | 12/1980 | Vasalos et al. | 208/120 |
| 4,465,588 | 8/1984 | Occelli et al. | 208/120 |
| 4,465,779 | 8/1984 | Occelli et al. | 502/63 |
| 4,493,902 | 1/1985 | Brown et al. | 502/65 |
| 4,515,903 | 5/1985 | Otterstedt et al. | 502/68 |
| 4,549,548 | 10/1985 | Wittkampf et al. | 128/419 PG |
| 4,549,958 | 10/1985 | Beck et al. | 208/253 |
| 4,707,461 | 11/1987 | Mitchell et al. | 502/64 |
| 4,732,747 | 3/1988 | Garces | 423/328 |
| 4,895,636 | 1/1990 | Chen et al. | 208/113 |
| 4,920,087 | 4/1990 | Wormsbecher | 502/68 |
| 4,929,338 | 5/1990 | Wormsbecher | 208/120 |
| 4,944,865 | 5/1990 | Occelli | 208/121 |
| 4,988,654 | 1/1991 | Kennedy et al. | 502/84 |
| 5,071,806 | 12/1991 | Pecoraro | 502/68 |
| 5,071,807 | 12/1991 | Kennedy et al. | 502/84 |
| 5,082,814 | 4/1992 | Stockwell et al. | 502/68 |
| 5,128,027 | 9/1992 | Halaka et al. | 209/5 |
| 5,141,624 | 1/1992 | Liao et al. | 208/52 CT |

FOREIGN PATENT DOCUMENTS

| | | |
|---|---|---|
| 0650503 | 10/1962 | Canada .................... 502/84 |
| 1165301 | 4/1984 | Canada . |
| 0043358 | 6/1981 | European Pat. Off. . |
| 0109064 | 11/1983 | European Pat. Off. . |
| 020152 | 1/1986 | European Pat. Off. . |
| 0189267 | 1/1986 | European Pat. Off. . |
| 270211 | 1/1987 | European Pat. Off. . |
| WO8200105 | 1/1982 | PCT Int'l Appl. . |
| 0271496 | 5/1970 | U.S.S.R. .................... 502/84 |
| 218314A | 10/1984 | United Kingdom . |

Primary Examiner—Carl F. Dees
Attorney, Agent, or Firm—I. L. Moselle

[57] ABSTRACT

Disclosed is a vanadium trap for use in FCC which comprises a major amount of calcined kaolin clay, free magnesium oxide and an in situ formed magnesium silicate cement binder. Also disclosed are procedures for the preparation of the trap by forming a slurry in water of hydrous kaolin clay, magnesium oxide or magnesium hydroxide and sodium silicate, aging the slurry to form magnesium silicate in situ, optionally adding additional kaolin, colloidal silica or both, spray drying, and calcining the resulting spray dried microspheres without forming appreciable amounts of crystalline magnesium silicates or crystalline magnesium aluminates.

17 Claims, No Drawings

COMPOSITION FOR PASSIVATING VANADIUM IN CATALYTIC CRACKING AND PREPARATION THEREOF

BACKGROUND OF THE INVENTION

This invention relates to magnesium oxide based compositions in the form of attrition-resistant fluidizable microspheres which are circulated with microspheres of zeolitic fluidizable cracking catalysts. The magnesium oxide based particles minimize or prevent poisoning and deactivation of the zeolitic cracking catalysts by vanadium contained in oil feedstock used in the catalytic cracking process. The invention relates also to processes for producing such compositions by spray drying a slurry containing magnesium oxide, kaolin clay and in situ formed inorganic cement.

Poisoning and deactivation of catalyst in FCC (fluid catalytic cracking) by vanadium in the oil feedstock is one of the most prominent problems faced by operators of oil refineries. Patents including disclosure of the use of alkaline earth compounds, including magnesium oxide, to mitigate the effects of vanadium include U.S. Pat. Nos. 4,465,779, 4,549,548, 4,944,865, WO 82/00105, GB 218314A, EP-A-020151 and EP-A-0189267. In some of these references, the magnesium oxide is contained in discrete particles, separate from the particles of zeolite cracking catalyst. EP-A-270,211 discloses discrete particles in which magnesium is present as a crystalline magnesium silicate, preferably fosterite. The material containing crystalline magnesium silicate may be produced by spray during a slurry containing magnesium carbonate and kaolin clay, followed by high temperature calcination to react the magnesium with silica in the clay, forming the crystalline magnesium silicate. Other disclosures of crystalline magnesium containing silicates (clays such as sepiolite) appear in U.S. Pat. No. 4,549,548 supra.

Efforts to develop products and processing modifications to mitigate vanadium passivation are by no means limited to the use of alkaline earth material. To the best of our knowledge, however, no magnesium based additive has enjoyed widespread commercial success. Certain perovskites such as barium titanate are employed commercially. Perovskites are expensive. Perovskites are not considered to be very effective in reducing SOx emissions in regenerator flue gas. Alkaline earth material, especially magnesium oxide, offers the additional benefit of reducing Sox in regenerator flue gas from cracking units. See, for example, WO 82/00105GB (supra).

There is strong motivation to utilize the inherent vanadium binding and Sox capturing capacity of magnesium oxide in FCC operations utilizing feedstocks having a high content of vanadium. References cited above give some indication of past efforts to produce magnesium oxide based vanadium passivating particles adapted for co-circulating with zeolite cracking catalysts. Commercial success has not measured up to the motivation. One primary challenge was to provide a metals passivator in a physical form of particles sufficiently attrition-resistant for use in FCC, while maintaining the magnesium in most reactive form (oxide). This problem was addressed in EP-A-270,211. The solution proposed in that patent application resulted in particles that were attrition-resistant in fresh form but lost hardness when subjected to steaming in testing.

Magnesium oxide without a binder/matrix is unsuitable for use in an FCC unit when it must be circulated through the reactor and regenerator of an FCC unit along with cracking catalyst particles. This is because particles of magnesium oxide readily break down into a powder when subjected to attritive forces. Note that in one of the earliest proposals to use magnesia in an FCC unit to combat SOx (U.S. Pat. No. 3,699,037), the material was circulated in the regenerator to bind SOx. The magnesia attrited during such use, eventually to be withdrawn from the regenerator with flue gas without circulating in the cracker, as would be required to achieve vanadium passivation. Because of the friable nature of magnesium oxide particles, the material did not circulate with the catalyst during the FCC cycle.

Numerous patents, including several of those cited above, disclose formulations based on composites of magnesia with kaolin clay. Kaolin clay is a widely used matrix component for cracking catalyst because it is inexpensive and has potential binding properties. Also, it is relatively catalytically inert in calcined form and is a prime candidate as a matrix/diluent for a vanadium passivator based on magnesia, wherein catalytic activity is not desired. An advantage of using kaolin clay as a matrix/diluent is that it can readily be formed into substantially catalytically inert particles by forming a dispersed concentrated fluid slurry to form microspheres, followed by spray drying. When dried, especially when calcined, kaolin also serves as a binding function.

Several of the references noted above provide examples of MgO/kaolin microspheres prepared by means including spray drying, but they do not disclose the composition of the feed slurry to the spray dryer. They do not provide information about attrition-resistance. There is no indication that the inventors were concerned with attrition-resistance or steam stability of the products. In the case of WO 82/00105GH, the matrix was a mixture of kaolin and silica-alumina gel, a conventional matrix for zeolite crystals in an active cracking catalyst. Silica-alumina is a material known to possess catalytic activity.

EP-A-270211, supra, refers to difficulties encountered in achieving attrition-resistance by mixing magnesia with kaolin clay, spray drying and calcination.

Those skilled in the art of handling clays are aware that introduction of magnesium ions into clay slurries causes the slurry to flocculate and thicken. This has been used with benefit in the formulation of various clay-based drilling mud. However, flocculation and thickening causes formidable problems in producing magnesia/kaolin clay products useful for FCC wherein particles of appreciable magnesium oxide content are produced in spray dryers. It is a simple matter to provide a dispersed kaolin slurry that is sufficiently fluid at a high enough concentration (e.g., 50% solids) to produce coherent microspheres. However, if kaolin is spray dried at low solids, e.g., 10%, the microspheres will fall apart before they can be hardened by calcination. If magnesium is added to such a high solids fluid dispersed slurry of kaolin in more than a trace amount, the slurry will flocculate and thicken. If enough magnesium ions are introduced, a solid gel forms and the slurry cannot be formed into microspheres by spray drying using known technology. Addition of magnesium oxide to a kaolin slurry in amount sufficient to produce spray dried particles having a sufficiently high MgO content for effective vanadium passivation will result in a slurry that cannot be spray dried in continuous commercial spray drying equipment. This problem plagued the inventors of the subject patent application in their pursuit of developing attrition-resistance spray dried microspheres containing magnesia with a clay diluent which meet the criteria for a good vanadium trap: attrition-resistance; high capacity for vanadium trapping; good vanadium passivation; and very high trapping efficiency (i.e., fast vanadium uptake).

To produce such particles it was necessary to overcome the difficulty caused by flocculation of a dispersed slurry of kaolin clay by the incorporation magnesium ions, resulting in thickening or even gelation of the slurry and, ultimately, the inability to formulate a slurry of sufficiently high solids content to produce attrition-resistant spray dried microspheres. The need to control flocculation and thickening to achieve hardness was counterbalanced by the need to product microspheres that were sufficiently porous to function as an effective magnesium passivator.

SUMMARY OF THE INVENTION

Novel vanadium passivation particles of the present invention are in the form of spray dried attrition-resistant microspheres composed of a minor amount of magnesium oxide, a major amount of calcined kaolin clay admixed therewith and a small amount, relative to the magnesium of oxide, of an in situ formed amorphous magnesium silicate cement. The particles have a low surface area and have minimal cracking activity.

Vanadium traps of the invention can be used with commercially available zeolitic catalysts in FCC units where vanadium levels are high, thereby avoiding rapid catalyst deactivation. These traps permit refiners to operate at lower catalyst make-up rates and will also reduce coke and gas associated with catalytic dehydrogenation by vanadium. The vanadium capacity of traps of the present invention is very high; the sulfate tolerance is excellent, is evidenced by the fact that essentially no sulfur remains on equilibrium vanadium traps of this invention. In the near future, many more refiners will be using residual feeds which will increase the vanadium concentration on the catalyst. The necessity to use efficient vanadium traps will therefore increase. Frequently feedstock with a high vanadium concentration also contain high levels of sulfur. The SOx binding capability of products of the invention is an added benefit.

Products of this invention are obtained by processing steps comprising mixing magnesium oxide or magnesium hydroxide, hydrous (uncalcined) kaolin clay and sodium silicate with water to form a dispersed fluid slurry which is aged. During aging, the basic magnesium compound reacts with sodium silicate to produce magnesium silicate which functions as a binder in the finished product. Optionally colloidal silica, additional kaolin clay or both are added to the aged slurry. The proportion of magnesium oxide relative to sodium silicate is controlled to assure that only a small amount of magnesium silicate is formed, leaving the bulk of the magnesium oxide unreacted and available in the product to passivate metals and, if desired, to bind SOx. The slurry is spray dried to form microspheres which are calcined under conditions sufficiently mild to dehydrate the kaolin while preventing or minimizing the formation of crystalline magnesium silicate and/or magnesium aluminates.

One key manufacturing parameter which the inventors believe is crucial is the avoidance of large amounts of magnesium silicate formation in such a way that only marginal reaction between the two components can take place. Another key parameter is a moderate calcination temperature which avoids the formation of significant amounts of crystalline magnesium silicate and aluminate, thereby preserving the bulk of the MgO throughout the process. A significant amount of crystalline magnesium silicate or aluminate would be a quantity such that more than about half of the magnesium oxide is consumed in forming that crystalline material. Still another key parameter is assuring that the magnesium oxide is well dispersed from the time it is mixed with other ingredients to form a slurry until spray drying takes place. Thus, in order to produce these microspheres in a form sufficiently attrition-resistant for use in FCC involves careful selection of starting materials (MgO, clay and binder) and making a careful selection of slurry preparation procedures prior to spray drying.

In one presently preferred embodiment of the invention, the vanadium passivator particles are obtained by spray drying a concentrated (high solids) slurry of dispersed kaolin clay, dispersed magnesium oxide or magnesium hydroxide, or mixtures thereof, sodium silicate, and, optionally colloidal silica, wherein the kaolin clay is introduced in stages. In the initial stage, only a portion of the total kaolin clay included in the spray dryer feed slurry is mixed with magnesium oxide or hydroxide to form a low solids slurry, e.g., 30% solids. This slurry is permitted to age and consumes only a small amount of the added magnesium oxide or hydroxide. This results in the formation of a magnesium silicate cement by reaction of a small portion of the magnesia content of the slurry with silica introduced as sodium silicate. Solids are sufficiently low in this slurry so that it is fluid in spite of the fact that it contains both kaolin clay and magnesium oxide. The remaining kaolin is injected into the first stage slurry using high shear static mixing (as by an inline mixer) to form a fluid high solids slurry (e.g., at least 50% solids). This slurry is immediately spray dried. The spray dried microspheres are then calcined at a time and temperature sufficient to dehydrate the kaolin and harden the particles. It is not necessary to wash the particles to remove solubles. Calcination conditions are controlled to minimize the formation of crystalline magnesium silicates or other crystalline magnesium compounds such as magnesium aluminates. Some mullite may be present in an x-ray diffraction pattern of the product. Calcination converts the hydrous kaolin to the metakaolin state.

In another preferred embodiment, all of the kaolin is added to the slurry containing magnesium oxide. This slurry is aged to form some magnesium silicate. Colloidal silica is preferably added and the resulting slurry is spray dried to form microspheres which are carefully calcined.

DESCRIPTION OF PREFERRED EMBODIMENT

Typical properties of the spray-dried and calcined vanadium trap microspheres of the invention are as follows:

|  | BROAD RANGE | PREFERRED RANGE | ESPECIALLY PREFERRED RANGE |
| --- | --- | --- | --- |
| Bulk MgO[1], wt % | 2–40 | 5–25 | 7–20 |
| Free MgO[2], wt % | 3–35 | 4–20 | 5–15 |
| BET surface area, m$^2$/g | 0.1–25 | 1–20 | 2–15 |

|  | BROAD RANGE | PREFERRED RANGE | ESPECIALLY PREFERRED RANGE |
|---|---|---|---|
| Pore volume cc/g | 0.1-0.4 | 0.15-0.35 | 0.15-0.30 |
| EAI (attrition resistance), wt % | 0.1-2.0 | 0.2-1.5 | 0.3-1.3 |
| Roller attrition, wt % | 2-40 | 4-30 | 5-20 |
| Average particle size, microns | 50-120 | 55-100 | 55-90 |
| Average particles <0-40 microns | 5-50 | 7-40 | 10-35 |

(1) By chemical analysis
(2) By x-ray

Magnesium oxide in the crystalline form of periclass has been used in practice of the invention. Another form of magnesium oxide that may be used is brucite. It is necessary to use a reactive form of magnesium oxide but the reactivity will be selected with regard to the specific processing conditions employed, as explained hereinafter.

One procedure for making products of the invention on a laboratory scale involves making down a slurry of hydrous kaolin (75 to 85 wt %, VF basis), MgO (7-15 wt%, VF), sodium silicate solution (preferably having a $Na_2O/SiO_2$ mole ratio of 0.35), and water on a high shear mixer such as a Cowles mixer to form a fluid slurry having a total solids content of 25-35% by weight, expressed on a VF solid weight basis. After the initial blending, this mixture is allowed to mix from 6 to 12 hours in a slowly rotating container. During this "aging" step, magnesium oxide reacts with sodium silicate and silica in the slurry to form magnesium silicate which ultimately serves as a binder in the calcined microspheres. Only a portion of the magnesium oxide reacts, whereby free magnesium oxide (detectable by X-ray diffraction) is present in the product. The pH of the slurry increases during the reaction between magnesium and silica. Aging may be carried out at ambient temperature and pressure. After aging, colloidal silica (which serves as a co-binder) is added to the slurry (1-5 wt % VF $SO_2$) with enough water to maintain a Brookfield viscosity of <1000 centipoises. The slurry is then spray dried, preferably immediately to avoid thickening and gelation. Spray drying converts the slurry into microspheres with an average particle size equivalent to FCC catalyst (for example, average particle size of about 75 microns). These microspheres are then calcined in covered silica trays for 2 hrs. at 1800° F. Calcination "sets" the binder(s), converts the hydrous kaolin to metakaolin and leaves free magnesia in the microspheres.

This procedure has been employed using water-washed, high purity Georgia hydrous kaolin with particle sizes ranging from 60 to 90% by weight finer than 2 microns, preferably from 75 to 80% finer than 2 microns. In this procedure, improved attrition due to finer clay particles and the use of colloidal silica is off-set by a corresponding decrease in macropore volume.

The MgO used in this procedure has a surface area (BET, nitrogen) from 1 to 25 $m^2/g$, with a median particle size from 1-10 microns. Preferred specifications are 1 to 10 $m^2/g$ surface area and a median particle size of from 4 to 5 microns. When carrying out this processing, higher surface area MgO reacts too quickly in the clay slurry, producing soft microspheres upon spray drying. Reduced amounts of MgO improve attrition but also reduce the effectiveness of the MgO for vanadium passivation. The preferred amount is about 15 wt % in the finished product. Magnesium should not be used in the form of magnesium hydroxide or magnesium carbonate. Both give rise to problems due to particle shrinkage, ultimately resulting in vanadium traps having poor attrition resistance.

Sodium silicate binder as NO Brand (27% $SiO_2$, 9% $Na_2O=0.32$ $Na_2O/SiO_2$) increases particle attrition properties at higher levels but also significantly reduces macroporosity. The preferred level is 1.25% as $SiO_2$ when using N Brand sodium silicate. Increased sodium silicate levels increased attrition resistance of the particles up to a point. Higher levels of sodium silicate, however, undesirably reduced macroporosity. Colloidal silica levels of from 1 to 5 wt %, preferably 1.25 to 3.75% as $SiO_2$ are preferred. After addition of colloidal silica to the clay/MgO/sodium silicate slurry, the resulting colloidal silica enriched slurry should be immediately spray dried to prevent thixotropic gelation.

The primary processing variable affecting hardness in this (as well as other variants of processes of the invention) is aging. The term aging refers to the stage of processing wherein magnesium oxide on hydroxide reacts with sodium silicate in the clay/MgO/sodium silicate slurry. Excessive aging due to either undesirably high MgO reactivity (10 $m^2/g$ surface area preferred), or excessively high initial slurry solids (<30% solid preferred) results in relatively soft particles.

The slurry may be spray dried in a conventional spray dryer (wheel or nozzle) and calcined. Typical spray dryer conditions are inlet temperatures of 650°-820° F. and outlet temperatures of 190°-230° F. Typical bed temperature during calcination is about 1800° F. Calcination conditions used are sufficient to dehydrate the kaolin but insufficient to cause the characteristic kaolin exotherm to take place.

In another procedure, which is especially amenable to continuous commercial implementation, addition of kaolin clay is staged to control the viscosity of the feed throughout processing and the grade of magnesia is selected to assure controlled aging. In this procedure, aging of the clay/Mgo slurry is controlled by making the initial MgO slurry using only a portion of the hydrous kaolin clay of the total kaolin, e.g., 5-20% to be present in the feed charged to the spray dryer. Preferably ultrafine kaolin, e.g., 90-100% by weight finer than 2 microns is used. A preferred level of hydrous clay is about 15% of the total hydrous kaolin. A lignosulfate dispersant should be used to maintain the MgO in dispersed condition when using this procedure. In preparing the first, relatively low solids slurry, it is preferable to cofeed lignosulfonate dispersant and clay and then incorporate magnesium oxide. This slurry is then aged, resulting in formation of magnesium silicate. The pH increases during aging and the viscosity of the slurry increases. The remainder of the clay, preferably an ultrafine grade, is added immediately before spray drying so as to assure minimal contact time between the additional clay and the initial slurry. The remainder of the clay is preferably added as a concentrated fluid dispersion, e.g., a slurry containing 68-70% solids, to assure that the spray dryer operates with a high enough solids slurry to assure an attrition-resistant product. These microspheres are formed by spray drying, as described above, and are then calcined in covered trays for 2 hrs. at 1800° F. in laboratory scale operations.

Using commercial rotary calciners a bed temperature of about 1800° F. is suitable.

For this two stage kaolin clay addition procedure, a more reactive (light burned) MgO is desired with a surface area of from about 5 to 70 m²/g. The preferred surface area is 35 to 65 m²/g. High surface area MgO is suitable in this procedure because of the minimized contact time with the bulk of the clay slurry prior to spray drying.

Using this two stage kaolin addition procedure, a sodium silicate binder precursor with a molar ratio of $SiO_2/Na_2O$ of 2.88 has proved better than sodium silicates with a 3.12-3.25 molar ratio. Levels of the preferred sodium silicate are from 0.75 to 2.5 wt % as $SiO_2$. A preferred level is of about 2% $SiO_2$. [All weights of $SiO_2$ referred to are reported on a VF weight basis.)

The addition of colloidal silica in this two stage kaolin addition procedure is optional. The benefit of enhanced attrition achievable by adding colloidal silica (which is made to the first slurry for this procedure) is weighed against the increase in the solids and increase in viscosity of the initial MgO/kaolin clay slurry. Lower solids prevent premature aging of the slurry and softer particles.

Passivator microspheres of the invention are used to prevent vanadium poisoning of zeolitic cracking catalyst used to crack gas oil and resids. The active catalyst particles contain one or more zeolites, usually including at least one of the Y type, in a matrix/diluent, typically silica-alumina. The catalysts may be prepared by in situ procedures, e.g., processes described in U.S. Pat. No. 4,493,902, or by procedures in which previously crystallized zeolite is mixed with matrix components, e.g., kaolin and silica-alumina gel. Generally particles of zeolitic cracking catalyst and passivator are similar in size, although they can be different if desired.

Passivator microspheres of the invention may be blended with separate zeolite catalyst particles before introducing the catalyst to an FCC unit. Alternatively, the passivator particles can be charged to circulatory catalyst inventory in the cracking unit. Typically the particles are mixed in amounts within the range of 2 to 50% by weight, preferably 10 to 40% by weight, and most preferably 20 to 30% by weight of the mixture. When used in insufficient amounts, improvements in vanadium passivation may not be sufficient. When employed in excessive amounts, cracking activity and/or selectivity may be impaired. Optimum proportions vary with vanadium level of feed and the proportion of magnesia in the passivator particles.

In the specification and illustrative examples, the following procedures for measuring and characterizing materials were used.

All proportions are on a weight basis.

The term "VF" weight refers to volatile free weight and is determined by heating a sample to constant weight at 1800° F.

Surface area measurements were by the known BET method using nitrogen as adsorbate.

The particle sizes of clay materials used in preparing samples were determined by conventional sedimentation procedure.

Attrition resistance is reported by EAI and Roller attrition values. The Roller Procedure is described in U.S. Pat. No. 5,082,814, the teachings of which regarding this test procedure are incorporated herein by cross-reference. The EAI procedures is described in U.S. Pat. No. 4,493,902, incorporated herein by cross-reference.

Catalytic activity was measured by the MAT procedure described in U.S. Pat. No. 4,493,902, the teachings of which are incorporated herein by cross-reference. Porosity measurements are made by mercury porosimetry as set forth in this patent.

Percent "free" MgO was determined by conventional X-ray diffraction by measuring and adding the integrated peak intensity of the three MgO XRD lines at 42.9°, 62.3° and 78.6° 2θ, using Cu K-alpha radiation and comparing the values to those of a pure MgO standard.

In all of the illustrative examples, MgO was in periclase form.

The following procedure was used in some of the illustrative examples to deposit vanadium prior to catalytic evaluation. This procedure is believed to give more realistic results than the known Mitchell method because it takes into account transfer of vanadium from zeolitic cracking catalyst particles to vanadium trap particles during the FCC cycle. In this method, a neutral body (kaolin clay particles calcined at 2150° F. for 2 hours) was first impregnated with vanadium. The surface area of these particles was less than 3 m²/g; the particles had no activity for catalytic cracking. Vanadium migration from these particles to blended FCC catalyst particles was measured after steaming at 1450° F. for 4 hours in a 90% steam/10% air atmosphere. In a blend containing 70% of a regular FCC catalyst (sample B described below) with mesh size of 230-325 (US Standard) and V impregnated on neutral particles (A), only 5% of the V was retained by sample A. This indicates the V would be released from sample A to the FCC catalyst (sample B) during steaming which would mimic the FCC operation more accurately than the Mitchell impregnation method.

To prepare sample A, vanadium containing particles, vanadium from vanadium naphthenates was deposited over a chemically neutral microspheres by using vanadium naphthenates of 1.5% concentration in hexane over 500 grams of a highly calcined clay (2100° F.) to obtain a loading of about 1500 ppm vanadium. The impregnated particles were then dried overnight and calcined first at 700° F. and then 1100°F. vanadium analysis of these particles showed the presence of 7500 ppm. Vanadium was analyzed by inductively coupled plasma spectroscopy (ICP).

To prepare sample B, a commercial FCC catalyst manufactured by Engelhard Corporation was used. The catalyst contained (40%) Y-zeolite and was exchanged to a rare-earth oxide level of 0.8%.

Neutral particles with no V sink were highly calcined kaolin clay particles (2150° F.) that had less than 3 m²/g surface area and nil catalytic cracking activity.

Vanadium trap microspheres are described in illustrative examples.

In carrying out the new procedure, 15 grams of the FCC catalyst (sample B) were blended with 20% (by weight) of sample C and 30% of sample A so that the finished catalyst contained 50% FCC catalyst with a vanadium level of 2500 ppm. The blended material was then steamed in 90% steam/10% air at 1450°F for 4 hours in a closed reactor. The catalyst blend was then analyzed before and after steaming to confirm that the composition of the blend did not change during steaming.

EXAMPLE #1

Procedure for Testing Unreacted Magnesium oxide

Tests were carried out to determine parameters for preserving magnesium oxide while forming a binder of magnesium oxide in situ. The components used were as follows:

| | |
|---|---|
| Hydrous Clay | 814 g |
| MgO AM94 | 140.7 g |
| N ® Brand Sodium Silicate | 37.9 g |
| H$_2$O | 1298.7 g |
| Colloid Silica (added) | 248.0 g |

A slurry consisting of a hydrous (ASP®-600 supplied by Engelhard Corporation), Mgo (American Mineral's AM 94, surface area of 10 m$^2$/g), N®Brand sodium silicate and water were made down using a high shear drill press mixer. This mixture was then allowed to age over night in a slowly rotating container. After aging, a colloidal silica solution (Nalco #2326) was added to the mixture with enough water to maintain a flowable mixture (<1000 CPS Brookfield viscosity, #2 spindle). This slurry was then screened to remove any agglomerates, and spray dried to a particle size similar to FCC catalyst (~70u APS). Calcination of the spray dried microspheres was performed at temperatures of from 1500°-1900° F. @2 hrs. The following table indicates that as the calcination temperature is increased, pore volume decreases, attrition improves and the formation of periclase (as measured by XRD) is decreased.

| Calcination Temp. °F. | PV (600-20K) | Free MgO % | Roller Attrition, % |
|---|---|---|---|
| 1500 | 0.3346 | 12.5 | >30 |
| 1800 | 0.2115 | 10.8 | 17 |
| 1900 | 0.1047 | 8.3 | 10 |
| 2100 | — | 7.0 | — |

EXAMPLE 190 2

Preparation and Testing of Control Microspheres

A slurry consisting of a hydrous clay (ASP®600 supplied by Engelhard Corporation), tetrasodium pyrophosphate clay dispersant (10 lb/ton) and water were made down to a clay solids content of 60% by weight using a high shear drill press mixer. This grade of kaolin is approximately 80% by weight finer than 2 microns. The slurry was screened to remove any agglomerates, and spray dried to a particle size similar to FCC catalyst (~70u APS). The spray dried particles were then calcined at 2150° F. for 2 hours and designated sample C. The kinetic activity of sample C was less than <0.1.

Kinetic activity is calculated as follows:

$$\frac{MAT \text{ conversion}}{100 - MAT \text{ conversion}},$$

wherein conversion is on a weight basis

The effectiveness of these particles as a vanadium trap was tested by the new procedure described above. Fifteen (15) grams of FCC catalyst was blended with 6 grams of sample C and 9 grams of sample A, whereby the final catalyst contained 2500 ppm V. After steaming in 90% steam/10% air for 4 hours at 1450620 F., the sample was tested for catalytic activity by the MAT procedure: The kinetic activity of the steamed catalyst was 1.0.

This procedure was used f or comparing blends in which the inert particles C were substituted by samples which contained M90 as a vanadium trap.

EXAMPLE #3

This example further demonstrates the importance of providing free magnesium oxide in clay-based vanadium passivator particles. In this example, the magnesium oxide starting material was converted to crystalline magnesium compounds as a result of the use of excessively high temperature during final calcination.

Hydrous kaolin clay microspheres made according to Example 2 were calcined at 1300° F. for 1 hour to transform the clay to the metakaolin form. 100 grams of the metakaolin microspheres was impregnated with 100 grams of magnesium nitrate solution containing 10% Mgo. The microspheres were dried at 250° F. and calcined at 2100° F. in a muffle furnace for 2 hours. These microspheres were designated sample G.

The surface area of the calcined microspheres was less than 1 m$^2$/g; XRD analysis showed the presence primarily of mullite, fosterite, (crystalline magnesium silicate) cristobalite, anatase, rutile and spinel (MgAlO$_3$) No free MgO was observed in these microspheres.

These microspheres, tested as a V trap, had an activity of only 1.1 which is only 10% better than the control.

EXAMPLE #4

In this example, magnesium carbonate was used as the source of magnesium. Colloidal silica was used as a binder. Calcination was at relatively high temperature (2100° F.).

A slurry consisting of a hydrous kaolin clay (ASP®600 supplied by Engelhard Corporation), MgO (Premier's 33 MGCO$_3$), N®Brand sodium silicate and water was made down using a high shear drill press mixer. This mixture was then allowed to age overnight in a slowly rotating container. After aging, colloidal silica (Nalco #2326) was added to the mixture with enough water to maintain a flowable mixture (<1000 CPS Brookfield viscosity). This slurry was then screened to remove any agglomerates, and spray dried to a particle size similar to FCC catalyst (~70u APS). Specific amounts of reagents were as follows:

| | |
|---|---|
| Hydrous clay | 814.0 g |
| MgCO$_3$ (50% slurry) | 630.0 g |
| N ® Brand sodium silicate | 43.9 g |
| Water | 550.0 g |
| Colloidal Silica solution (15% SiO$_2$ by Wt) | 254.4 g |

Spray drying conditions were as follows:

| | |
|---|---|
| Inlet Temp | 600–650° C. |
| Outlet Temp | 240–260° C. |
| Air Pressure | 40 psig |
| Pump Rate | 1 |

The dried microspheres were then calcined at a temperature of 2100° F. @2 hrs. These microspheres were designated sample H.

| Sample | Surface Area, m2/g | Pore Volume 600-20KA, cc/g | Roller Attrition, % |
|---|---|---|---|
| H | 2.2 | 0.25 | >30 |
| I | 13.5 | 0.38 | 6 |

Sample H was tested for vanadium control. Activity was 1.2 which is 20% better than the control, sample C.

EXAMPLE #5

This example further demonstrates the desirability of maintaining appreciable free Mgo in a vanadium trap.

A portion of the spray dried microspheres of Example 4 were calcined at 1800° F. This material was sample I. An X-ray diffraction pattern of the calcined microspheres showed high level of free MgO, which the inventors consider a necessary component for an effective vanadium trap. These microspheres tested in the same manner as described in Example #1, showed an activity of 1.5, about 50% higher activity than the control.

EXAMPLE 190 6

This example illustrates an embodiment of the process of the invention carried out in plant-scale equipment.

Processing of the spray dryer slurry consisted of initially mixing N Brand sodium silicate, water, carboxyl methyl cellulose (used as a suspending agent for magnesium oxide) and a slurry of hydrous kaolin clay in a high shear mixer. The kaolin clay was nominally 80% by weight finer than 2 microns. This was followed by the addition of American Mineral's AM 94 MgO (surface area of 50 m$^2$/g) to achieve 12% MgO in the product. Prior to spray drying, Nalco colloidal silica (15% silica) was added to the slurry using an inline mixer. The solids content of the slurry was 33% by weight prior to addition of the colloidal silica and 31% after addition of the silica. The material was spray dried to a particle size slightly coarser than an FCC catalyst, averaging about 80 microns.

Component ratios were as follows:

|  | wt. |
|---|---|
| Hydrous Clay Slurry | 100 |
| N Brand sodium silicate solution | 2.07 |
| MgO | 7.86 |
| H$_2$O | 76.87 |
| CMC | 6.16 |
| Colloidal Silica | 15.39 |

The spray dried microspheres were calcined in a commercial rotary calciner at a furnace temperature of about 2100° F. (which corresponds to a laboratory calcination at 1700° to 1800° F. These calcined microspheres were designated sample J and were tested as in Example 1. They exhibited about 35% higher activity than particles C with no vanadium trap.

EXAMPLE #7

This example further shows the necessity for controlling calcination temperature to maintain free magnesium oxide in the passivator particles.

Processing was the same as in Example #6 except with a high calcination temperature of 2300° F. was used in operating the rotary calciner. This corresponds to a laboratory calcination temperature of from 2000-2200° F. The material calcined at 2300° F. was designated sample K.

Testing of sample K indicated similar activity maintenance to sample C and 35% lower than Example #6, sample J.

The Mitchell procedure for testing vanadium tolerance was used in the following example. Twenty-eight (28) grams of an FCC catalyst containing about 35% zeolite and 1.2% rare-earth oxide was blended with 12 grams of either neutral microspheres (no vanadium trap, sample C) or with samples containing MgO as a V trap. The blended particles were then impregnated with a solution of Ni and V naphthenates in cyclohexane solution. The impregnated material was then dried in air overnight and then calcined in a muffle furnace at 700° F. for 2 hours followed by calcination at 1100° F. for another 2 hours. Two levels of naphthenate solutions were impregnated over the blended particle to give finished products containing (1) Ni/V of 1000/2000 ppm and (2) 2500/5000 ppm. The samples were then steamed in a 90% steam/10% air for 4 hours at 1450° F. The samples were analyzed before and after steaming to demonstrate that similar compositions were maintained during steaming. Microactivity testing was then performed.

EXAMPLE #8

This example shows the calcination temperature sensitivity as tested under the Mitchell method protocol.

Twenty-eight (28) grams of commercial FCC catalyst from Engelhard Corporation containing about 35% zeolite and a rare-earth oxide level of 1.2% was blended with 12 grams of either of the following components: inert kaolin particles (C), highly calcined MgO/clay particles K (from Example 7), or low-temperature calcined MgO/clay particles i (from Example 6). The three mixtures were then impregnated with metals, using the Mitchell method.

At metals levels of 2000 ppm V/1000 ppm Ni, the mixture containing particles K had the same activity maintenance as the reference sample; the mixture containing particles of J] had 23% better activity maintenance. At 8000 ppm V/2500 ppm Ni, the activity maintenance improvements over sample C were 20% for the mixture containing particles K, and 50% for the mixture containing particles J.

The results clearly show that the lower level of calcination which retains high level of unreacted Mgo in the particles had better performance than the control, sample C.

EXAMPLE #9

This example illustrates a presently preferred method for practicing the invention.

For this process, the spray dryer feed slurry was prepared as two separate components which were combined in a static mixer immediately prior to spray drying. The first component "A" is composed of an ultrafine particle size Georgia Yaolin (1oo% finer than 1 micron) made into a 59.34% VF slurry with water and tetrasodium pyrophosphate (TSPP) as a dispersant. These high solids were achieved by blending a 44.7% solids clay slurry with sufficient spray dried kaolin and optimum TSPP in a high shear cowles mixer.

The second component "B" consisted of M90, as supplied by Martin Marietta Corporation as MagChem 40, #14 Grade sodium silicate provided by Power Silicates (41% solids, 2.88 molar SO$_2$:Na$_2$O Ratio) , HP- 100, a dispersant supplied by Martin Marietta and believed to be a lignosulfonate, the same ultrafine particle size clay used in component "A" supplied as a 44.7% VF solids slurry and sufficient water to a total VF solids of this component of 27.87%.

Component "B" was produced in a series of high shear Cowles mixers. In the first mixer, all the components except the MgO were added in the proportions listed below; in the second, the dry MgO was introduced and its addition rate was controlled by solids measurement.

| MIXER #1 | |
| --- | --- |
| Clay Slurry | 23.49% |
| #14 Silicate | 7.97% |
| HP-100 | .10% |
| $H_2O$ | 68.44% |

Target=14.04% VF solids and 2.55% $SiO_2$ from #14 silicate

| MIXER #2 | |
| --- | --- |
| Mixer #1 Slurry | 83.91% |
| MgO | 19.18% |

Target=27.87% VF solids

Component "B" slurry was then allowed to age in an agitated tank for a minimum of 6 hrs. prior to spray drying. Sufficient agitation was required to maintain the viscosity of this component at ~1000 centipoises by Brookfield measurement.

For spray drying, component "A" (the high solids clay slurry) and component "B" (the aged MgO slurry) were combined in a static mixer in the ratio of 1.337:1 respectively, and immediately pumped directly to the spray dryer atomizer. Target VF solids of the spray dryer slurry was 45.9%. Component ratios of the microsphere on a VF weight bases are: 15% MgO, 2.0% $SiO_2$ (provided from #14 silicate binder), 0.29% HP-100.

The spray dryer inlet temperature was regulated to maintain an outlet temperature of from 200°–205° F. and the atomizer speed used to control particle size distribution of the spray dried microspheres. Calcination on a direct fired rotary calciner followed spray drying with inlet temperatures of from 2000°–2200° F. to meet targeted finished product parameters.

We claim:

1. A spray drying process for manufacturing microspheres useful in fluid cracking of vanadium containing oil feedstock with separate fluidable microspheres containing a zeolitic cracking component, said process comprising mixing kaolin clay, magnesium oxide or magnesium hydroxide, and sodium silicate with water to form a slurry, aging said slurry to react a portion of the magnesium oxide or hydroxide with silica to form a magnesium silicate, spray drying the aged slurry to form microspheres comprising magnesium oxide, kaolin clay and in situ formed magnesium silicate, and calcining said microspheres for a time and temperature sufficient to dehydrate the kaolin clay but insufficient to form a significant amount of crystalline magnesium silicates or aluminates.

2. The process of claim 1 wherein colloidal silica, kaolin clay or a combination thereof is added to the aged slurry before spray drying.

3. The process of claim 1 wherein a portion of the kaolin clay in the slurry that is sprayed dried is added before again and additional kaolin clay is added to the aged slurry in an inline mixer.

4. A spray drying process for manufacturing attrition-resistant fluidizable microspheres comprising magnesium oxide in a kaolin clay matrix, said particles being useful in fluid cracking of oil feedstock with a separate fluidable microspheres containing a zeolitic cracking component to passivate vanadium originally contained in oil feedstock which comprises: forming a first fluid dispersed slurry (A) comprising water, kaolin clay, sodium silicate and magnesium oxide and a dispersant for magnesium oxide; aging said slurry; adding additional kaolin clay to said aged slurry to form a second slurry (B) having higher solids content than slurry (A) using high shear agitation sufficient to maintain said slurry fluid in spite of its higher content of solids; immediately spray drying said slurry B while it is still fluid; recovering the resulting microspheres comprising free magnesium oxide and kaolin clay; and calcining the microspheres for a time and temperature sufficient to dehydrate the kaolin but insufficient to cause the kaolin to undergo the characteristic kaolin exotherm or to form crystalline magnesium silicates or aluminates.

5. The process of claim 1 wherein the calcined microspheres contain from 2 to 40% by weight Mgo.

6. The process of claim 1 wherein the calcined microspheres contain from 5 to 25% by weight MgO.

7. The process of claim 1 wherein the calcined microspheres contain from 7 to 20% by weight MgO.

8. The process of claim 4 wherein said slurry A and said slurry B have an apparent viscosity below 1000 cp when measured by a Brookfield viscometer using a #2 spindle.

9. The process of claim 4 wherein said additional kaolin is added to said slurry B by an inline mixer which provides the high shear agitation.

10. The process of claim 4 wherein all of the kaolin clay is about 100% by weight finer than 1 microns.

11. The process of claim 4 wherein said sodium silicate has a mole ratio of $SiO_2/Na_2O$ of about 2.88.

12. Attrition-resistant microspheres useful as a vanadium trap in fluid catalytic cracking, said microspheres comprising particles of free MgO in amount of at least 2% by weight, determined by X-ray, in admixture with particles of fine particle size anhydrous, X-ray amorphous kaolin clay, and a small amount of a magnesium silicate cement, the anhydrous kaolin being the predominating component of said microspheres, said microspheres having a BET surface area below 15 $m^2/g$, being free from substantial amounts of crystalline magnesium silicate and crystalline magnesium aluminate phases, and having an EAI below 2% by weight before and after steaming at 1480° F. for 4 hours with 100% steam, and a total pore volume in the range of 0.1 to 0.4 cc/g.

13. The microspheres of claim 12 wherein the free MgO content is from 5–25% by weight.

14. The microspheres of claim 12 wherein the free MgO content is from 7–20% by weight.

15. The microspheres of claim 12, which have a total pore volume in the range of 0.15 to 0.35 cc/g.

16. The microspheres of claim 12 which have a total pore volume in the range of 0.15 to 0.3 cc/g.

17. The microspheres of claim 12 which have a surface area below 10 $m^2/g$.

* * * * *